Nov. 19, 1968 F. X. DOWNEY ET AL 3,412,347

TRANSISTORIZED PHASE MODULATOR SUITABLE FOR ANALOG DATA CONVERSION

Filed Feb. 2, 1966 2 Sheets-Sheet 1

INVENTOR
FRANCIS X. DOWNEY
ALICK H. FRANK

BY V. J. Di Pietro AGENT

[signature] ATTORNEY

INPUT TO DIODE 16

BASE OF TRANSISTOR 17

COLLECTOR OF TRANSISTOR 17

BASE OF TRANSISTOR 21

COLLECTOR OF TRANSISTOR 25

INVENTOR
FRANCIS X. DOWNEY
ALICK H. FRANK

BY V. J. Di Pietro AGENT
[signature] ATTORNEY

United States Patent Office 3,412,347

Patented Nov. 19, 1968

3,412,347

TRANSISTORIZED PHASE MODULATOR SUITABLE FOR ANALOG DATA CONVERSION

Francis X. Downey, Annandale, and Alick H. Frank, Springfield, Va., assignors to the United States of America as represented by the Secretary of the Navy Filed Feb. 2, 1966, Ser. No. 524,982

10 Claims. (Cl. 332—16)

ABSTRACT OF THE DISCLOSURE

A transistorized circuit for use as a phase shifter or an analog data converter. The circuit generally comprises a sawtooth signal generator synchronously triggered with the leading edge of an input signal, an adjustable delay control means for controlling the duration of the sawtooth signal, and means for converting the sawtooth signal to a square pulse having a pulse width equal to the time duration of the sawtooth signal. An output circuit coupled to the signal conversion means provides both positive and negative amplified information signals.

The invention described herein may be manufactured and used by or for the Government of the United States of America for governmental purposes without the payment of any royalties thereon or therefor.

The present invention relates to a transistorized phase modulator and more particularly to a transistorized phase shifter which may also be utilized as an analog data converter.

In the past, resolvers and R-C circuits have generally been employed as phase shifters, while comparators have been used as data converters. Many conventional phase shifters are not sufficiently linear and are at times unreliable. Comparators, which are linear, are expensive and require input and output circuitry.

The general purpose of this invention is to provide a unique transistorized circuit which embraces all the advantages of similarly employed circuits and possesses none of the aforedescribed disadvantages. To attain this, a unique transistorized circuit is provided which is reliable, compact, linear and relatively inexpensive. It may be utilized as either a phase shifter for adjusting data carriers to a proper phase relation with a reference signal, or as an analog data converter for converting A.C. or D.C. information signals into phase modulated data carriers. The circuit generally comprises a means for generating a sawtooth signal, means for triggering the sawtooth synchronously with the leading edge of the input signal, an adjustable delay control means for controlling the time duration of the sawtooth signal, and a means for converting the sawtooth signal into a square pulse having a leading edge synchronized with the leading edge of the input pulse and its trailing edge occurring at the end of the sawtooth signal. The trailing edge of the square pulse is thereby controlled by the adjustable delay control means. An output circuit is coupled to the means for converting the sawtooth signal into a square pulse which provides a positive amplified information signal and a negative amplified information signal.

An object of the present invention is the provision of a unique transistorized phase modulator.

Another object is to provide a transistorized phase modulator which is compact, inexpensive and linear.

A further object of the invention is the provision of a transistorized phase modulator for adjusting a data carrier to a proper phase relation with a reference signal, or as an analog data converter for converting A.C. or D.C. information signals into phase modulated data carriers.

Other objects and many of the attendant advantages of this invention will be readily appreciated as the same becomes better understood by reference to the following detailed description when considered in connection with the accompanying drawings, wherein.

Figure 1:
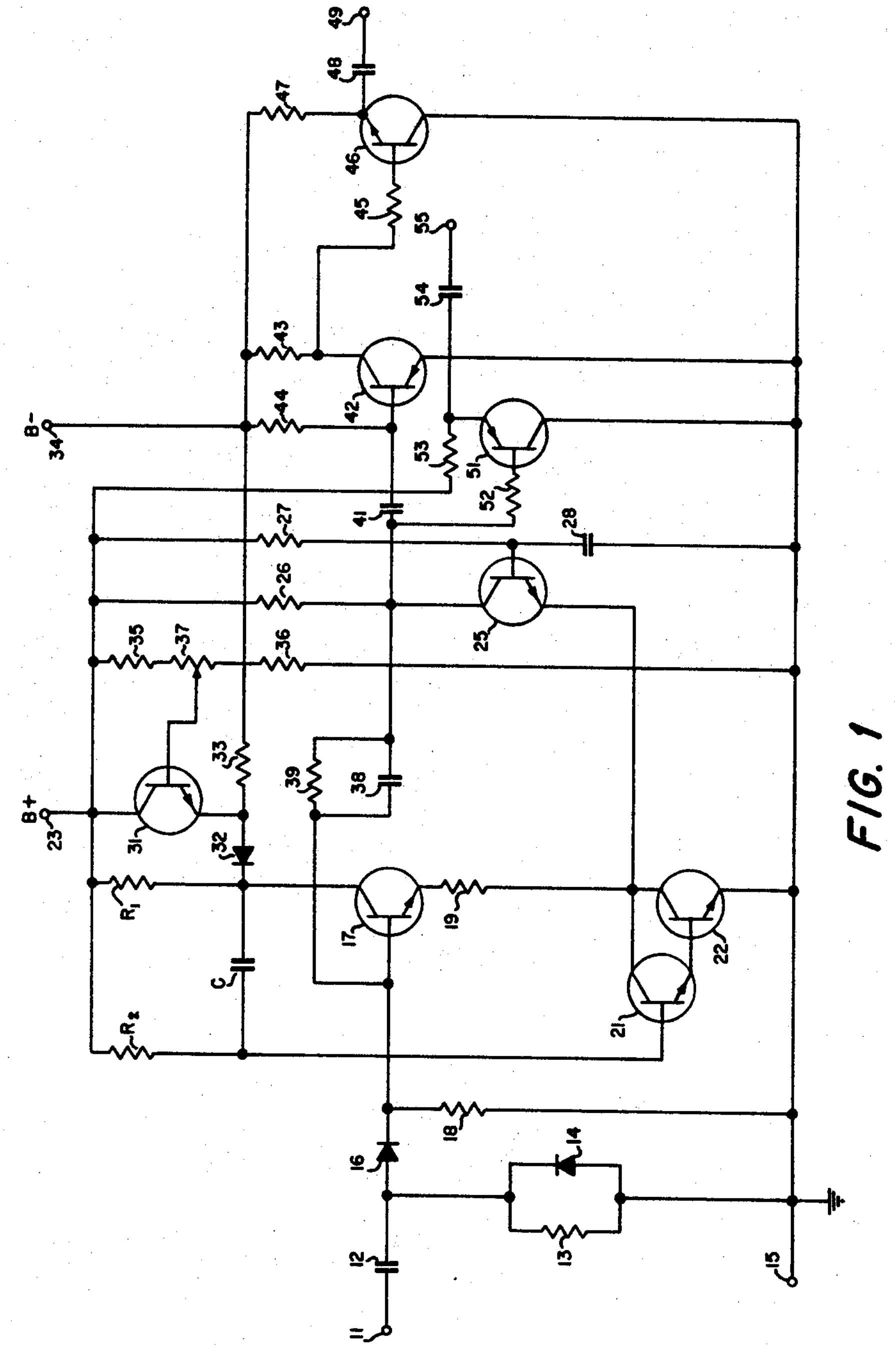
FIG. 1 is a schematic diagram of the circuit of this invention.
Figure 2A:
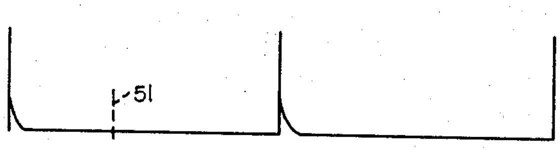
FIG. 2 illustrates a series of waveforms occurring at various points in the circuit of FIG. 1.
Figure 2B:
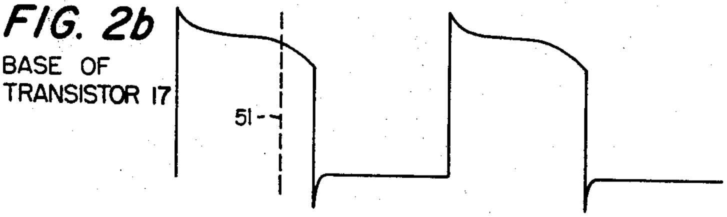
Figure 2C:
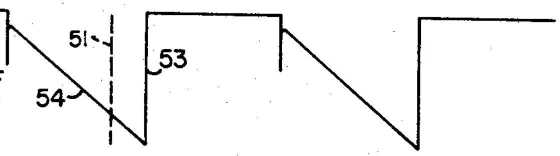
Figure 2D:
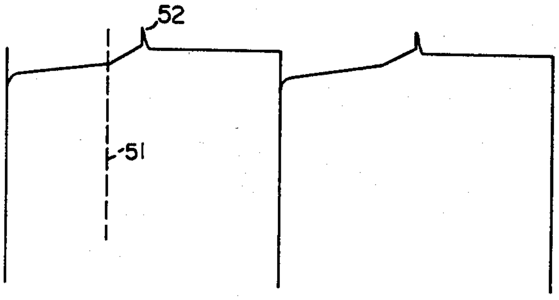
Figure 2E:
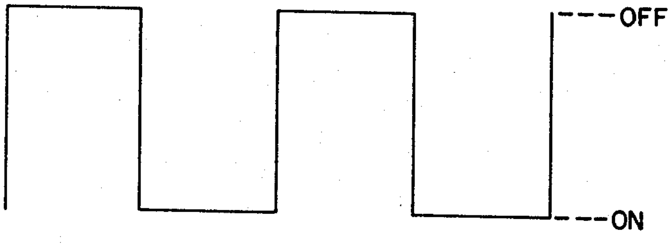

Referring now to the drawings, there is shown in FIG. 1 the circuit of this invention wherein a signal is applied to input 11 across which is coupled a differentiator comprising capacitor 12 and a resistor 13. A diode 14 is coupled across resistor 13 with its cathode coupled to capacitor 12 and its anode coupled to ground or voltage reference terminal 15 to shunt the negative-going excursions of the input waveform. Steering diode 16 is coupled in the input path with its anode coupled to capacitor 12 and its cathode coupled to the base of NPN transistor 17 which is coupled to ground thorugh a resistor 18. The emitter of transistor 17 is coupled through a resistor 19 to the common collectors of NPN transistors 21 and 22 which comprise a high impedance Darlington circuit. Transistor 21 has its emitter coupled to the base of grounded-emitter transistor 22 and its base coupled through resistor $R_2$ to a terminal 23 for connecting a positive voltage source. A capacitor C, which may be a variable capacitor, is coupled between the base of transistor 21 and the collector of transistor 17. The common collectors of transistors 21 and 22 are coupled to the emitter of NPN transistor 25, which has its collector coupled through resistor 26 to the positive voltage source. A biasing circuit comprising resistor 27, which is coupled between the base of transistor 25 and the positive voltage source, and a decoupling capacitor 28, which is connected between the base of transistor 25 and ground, biases transistor 25 in a normally ON condition.

The values of $R_1$, $R_2$ and C are chosen so that the time constant for discharging capacitor C through resistor $R_2$ is relatively large while the time constant for charging capacitor C through resistor $R_1$ is relatively small.

A delay control circuit is provided which comprises NPN transistor 31, having its collector coupled to the positive voltage source and its emitter coupled through diode 32 to the collector of transistor 17. The emitter of transistor 31 is coupled through current limiting resistor 33 to terminal 34 for connecting a negative voltage source. The base of delay control transistor 31 is biased by a voltage divider circuit comprising resistors 35, resistor 36 and a potentiometer 37 serially coupled between the positive voltage source and ground. Potentiometer 37 has its wiper arm coupled to the base of transistor 31 to provide a variable delay control voltage for controlling the end of the sawtooth signal generated at the collector of transistor 17. The bias voltage for the base of transistor 17 and the collector of transistor 25 are developed through the common voltage divider comprising resistors 26, 39 and 18. A speed-up capacitor 38 is coupled across resistor 39 to couple the collector of transistor 25 to the base of transistor 17 when transistor 25 switches from OFF to ON.

The square wave signal is generated at the collector of transistor 25 and is coupled to two output circuits, one of which provides a positive information signal while the other provides a negative information signal. The circuit providing the positive information signal comprises a coupling capacitor 41 coupled between the collector of transistor 25 and the base of PNP transistor 42, which has its emitter grounded and its collector coupled through resistor 43 to the negative voltage source. The base of transistor 42 is also coupled to the negative voltage source through a resistor 44. Transistor 42 produces a negative information signal at its collector which is fed through resistor 45 to the base of NPN transistor 46 having its collector coupled to ground and its emitter coupled through registor 47 to the negative voltage source. The positive information signal is taken from the emitter of emitter-follower transistor 46 and coupled through a capacitor 48 to output 49.

The output circuit for providing the negative information signal comprises an emitter-follower PNP transistor 51, having its base coupled through resistor 52 to the collector of transistor 25. The collector of transistor 51 is coupled to ground while the emitter is coupled through resistor 53 to the positive voltage source. The emitter of PNP transistor 51 is coupled through capacitor 54 to output 55, which provides the negative information signal.

In operation, phase shifting of a data carrier signal applied to input 11 is produced by the phantastron-type circuit comprising transistors 17, 21, 22 and 25 wherein the delay control voltage is applied through transistor 31. Two phase-shifted outputs are available, one at output 49, wherein the data is contained in the phase of the positive going edge, and the other output is provided at output 55 where the data is contained in the phase of the negative going edge.

The input signal is differentiated by the differentiator comprising capacitor 12 and resistor 13 as the negative going pulse is shunted through clamping diode 14. The positive pulses, which initiate the rundown of the circuit, are coupled to the base of transistor 17 through steering diode 16. These pulses are shown in FIG. 2(*a*). In the quiescent condition, transistor 17 is biased OF with no current flowing through either the base or collector while transistor 25 is biased ON so that a full current is flowing though the collector-emitter circuit. As a positive pulse is applied to the base of transistor 17, it is turned ON and its collector voltage drops. FIGS. 2(*b*) and 2(*c*) illustrate the pulses at the base and collector, respectively, of transistor 17. FIG. 2(*d*) illustrates the voltage at the base of transistor 21, while FIG. 2(*e*) illustrates the output at the collector of transistor 25.

The base of transistor 21, which is coupled to the collector of transistor 17 through capacitor C, senses the voltage drop at the collector of transistor 17 through the discharge of capacitor C. The sudden drop in voltage at the base of transistor 21 reduces the current through transistor 22, causing the current through transistor 22 to raise the voltage at the emitter of transistor 25 thereby beginning the cutoff of transistor 25. As transistor 25 turns OFF, its collector voltage rises and a rising voltage is applied through resistor 39 to the base of transistor 17. Speed-up capacitor 38 also couples the collector voltage to the base of transistor 17 during the transition of transistor 25 from ON to OFF. This is a regenerative action so that transistor 17 is turned ON just as rapidly as transistor 25 is being turned OFF. The voltage at the base of transistor 21 is not clamped to the sudden low level, but rises back to its initial value through resistor $R_2$ and capacitor C.

As the first regenerative action is completed, transistor 25 is in the OFF condition and the base voltage of transistor 21 begins to rise at a rate determined by the value of resistor $R_2$ and capacitor C which discharges through transistors 17 and 22. As the base voltage of transistor 21 rises, the current through transistor 22 rises, thereby causing the emitter voltage of transistor 25 and the collector voltage of transistor 17 to drop, since the base of transistor 17 is coupled through resistor 39 and capacitor 38 to the collector of transistor 25. When the collector voltage of transistor 17 drops to a value whereby diode 32 is biased ON (at a time designated by dotted lines 51 of FIGS. 2*a*–2*d*) the the rundown suddenly speeds up until the initial conditions exist, at which time transistor 25 turns ON and a second regenerative action then occurs which turns OFF transistor 17 and turns ON transistor 25 abruptly as indicated by the surge designated as spike 52 of FIG. 2(*d*). The recovery time, illustrated by slope 53 in FIG. 2(*c*), is determined by the charging time of capacitor C through resistor $R_1$ and is defined as $R_1C$. This time constant is made very short. The delay time introduced into the signal received at input 11 is determined by the rundown period of the circuit. The slope 54 of the rundown is observed at the collector of transistor 17 as illustrated in FIG. 2(*c*) and is proportional to $R_2C$. The rundown period is controlled by varying the bias voltage to the anode of diode 32. This bias voltage is varied by adjusting potentiometer 37 to control the amount of phase shift applied to the input signal and is applied to the base of transistor 31, through the emitter of transistor 31 and diode 32 to the collector of transistor 17. The bias voltage determines the point in the rundown curve shown in FIG. 2(*c*) where diode 32 conducts. It is therefore seen that the lowest voltage reached by the collector of transistor 17 during the rundown is determined by the setting of potentiometer 37 which provides a control voltage at the anode of diode 32 so that diode 32 conducts when the cathode voltage is sufficiently more negative than the anode. When diode 32 conducts, the voltage at the collector of transistor 17 begins its rise to the normal voltage (approximately equal to the positive bias voltage). The square pulse of FIG. 2(*e*) therefore has a time duration determined by the rundown, and has its leading edge synchronized with the leading edge of the input pulse.

In a preferred embodiment of the circuit of FIG. 1, the following component values have proven advantageous:

| Resistors: | Resistance (ohms) |
|---|---|
| 13 | 20K |
| 18 | 100K |
| 19 | 470 |
| $R_2$ | 1M |
| $R_1$ | 2.2K |
| 26 | 2.2K |
| 27 | 56K |
| 33 | 5.1K |
| 35 | 2K |
| 36 | 15K |
| 39 | 47K |
| 43 | 3K |
| 44 | 47K |
| 45 | 510 |
| 47 | 1K |
| 52 | 510 |
| 53 | 1K |
| Potentiometer 37 | 20K |

| Capacitors: | | Capacitance (farads) |
|---|---|---|
| 12 | pf | 300 |
| C | pf | 1000 |
| 28 | μf | 47 |
| 38 | pf | 510 |
| 41 | μfd | 10 |
| 48 | μfd | 2.2 |
| 54 | μfd | 2.2 |

Transistors 17, 21, 22, 25, 31 and 46 are silicon (NPN) types 2N2270, while transistors 42 and 51 are germanium (PNP) types 2N404A. Transistors 21 and 22 are selected for $B \geqq 80$ at approximately 10 microamps base current with 0.8 milliamp collector current at a collector voltage of 4 volts. Diodes 14, 16 and 32 are silicon types 1N659. Capacitor C may be variable in order to provide a desired percent of phase shift. The positive voltage source is approximately +12.6 volts while the negative voltage source is approximately −12.6.

The values above are given only for a specific embodiment of the circuit when utilized as a phase shifter and are provided solely by way of illustration. Other values, as well as other components, may readily be employed without departing from the scope of this invention.

In the operation of the circuit of FIG. 1 as a phase shifter, the phase of the input signal is varied in proportion to the amplitude of the bias applied to transistor 31. In the operation of the circuit as a data converter, a reference signal or carrier is applied to input 11 and an analog voltage proportional to an analog information signal is applied to the base of transistor 31 by means of appropriate circuitry. The analog voltage may be applied directly to the base of transistor 31 so that potentiometer 37 and biasing resistors 35 and 36 may be eliminated. It is to be understood that other component values, different from those set forth above, may be utilized to give optimum results where the circuit is utilized as a data converter.

What is claimed and desired to be secured, by Letters Patent of the United States is:

1. A circuit comprising:
input means for receiving an input signal, having a leading and trailing edge,
sawtooth generator means coupled to said input means for producing a sawtooth signal beginning at a time synchronized with the leading edge of said input pulse,
variable delay means operatively coupled to said sawtooth generator for controlling the length of said sawtooth signal, and
means for converting said sawtooth signal into a square pulse having a pulse width equal to the time duration of said sawtooth signal,
whereby said square pulse has a leading edge synchronized with the leading edge of said input pulse and a trailing edge occurring at a time determined by said variable delay means.

2. A circuit as set forth in claim 1 further including:
means for controlling said variable delay means in accordance with the variations of an analog signal,
wherein a reference signal is applied to said input means so that said reference signal is modulated in accordance with the variations of said analog signal.

3. A circuit as set forth in claim 1, wherein said sawtooth generator means comprises:
a first transistor having a base, emitter and collector, with the base coupled to receive the signal corresponding to the leading edge of said input pulse,
a second transistor having a base, emitter and collector,
a third transistor having a base, emitter and collector with its emitter grounded, its base coupled to the emitter of said second transistor, and its collector coupled to the collector of said second transistor and to the emitter of said first transistor,
first terminal means for connecting a voltage source,
a first resistor coupled between said first terminal means and the base of said second transistor,
a second resistor coupled between the collector of said first transistor and said first terminal means, and
a capacitor coupled between the collector of said first transistor and the base of said second transistor,
wherein said sawtooth signal is produced at the collector of said first transistor.

4. The circuit as set forth in claim 3, wherein said means for converting said sawtooth pulse to a square pulse comprises:
a fourth transistor having a base, emitter and collector, wherein its emitter is coupled to the common collectors of said second and third transistors, and its collector coupled to the base of said first transistor and to said first terminal means, and
means for biasing the base of said fourth transistor.

5. The circuit of claim 4, wherein said variable delay means comprises:
variable biasing means operatively coupled to the collector of said first transistor to provide a predetermined bias level at which said first transistor switches to end said sawtooth signal.

6. The circuit of claim 5, wherein said variable delay means further comprises:
second terminal means for connecting a voltage reference,
a fifth transistor having a base, emitter and collector, with its base coupled to said adjustable biasing means, its collector coupled to said first terminal means, and its emitter coupled to said second terminal means, and
a unidirectional element coupled between the emitter of said fifth transistor and the collector of said first transistor,
wherein said fifth transistor and said unidirectional element couple said variable biasing means to the collector of said first transistor.

7. The circuit of claim 6 further including an output circuit coupled to said means for converting said sawtooth signal into a square pulse for providing both a positive information signal and a negative information signal.

8. An electronic circuit comprising:
an input for receiving an input signal,
a differentiator coupled to said input for differentiating said input signal,
a clamping means coupled to said differentiator for shunting undesired polarity excursions,
first terminal means for connecting a source of voltage,
second terminal means for connecting a voltage reference,
a first transistor having a base, emitter and collector,
a unidirectional device coupled between said differentiator and the base of said first transistor for passing signals of a desired polarity to said first transistor,
a second transistor having a base, emitter and collector,
a third transistor having a base, emitter and collector, with its base coupled to the emitter of said second transistor, its collector coupled in common with the collector of said second transistor, and its emitter coupled to said second terminal means, wherein the common collectors of said second and third transistors are coupled to the emitter of said first transistor,
a fourth transistor having a base, emitter and collector, wherein its emitter is coupled to the common collectors of said second and third transistors,
a first biasing resistor coupled between the collector of said fourth transistor and said first terminal means,
a second biasing resistor coupling the collector of said fourth transistor to the base of said first transistor,
a third biasing resistor coupled between the base of said first transistor and said second terminal means,
a timing circuit comprising:
a first resistor coupled between said first terminal means and the base of said second transistor,
a second resistor coupled between the collector of said first transistor and said first terminal means,
a capacitor coupled between the collector of said first transistor and the base of said second transistor,
a delay control circuit coupled to said first transistor comprising:
variable biasing means operatively coupled to the collector of said first transistor,
means operatively coupled to said fourth transistor for biasing said transistor into a normal condition, and
an output circuit coupled to the collector of said fourth transistor.

9. A circuit as set forth in claim 8, wherein said variable biasing means, is controlled by an analog information voltage, and wherein a reference signal is applied to said input means, so that said reference signal is modulated by said analog information signal.

10. A circuit as set forth in claim 8, wherein said variable biasing means provides a predetermined bias level, and wherein a data carrier signal is applied to said input means, whereby said data carrier signal is phsae modulated by an amount proportional to said bias level.

References Cited

UNITED STATES PATENTS

| | | | |
|---|---|---|---|
| 3,005,961 | 10/1961 | Wallace | 328—36 X |
| 3,042,754 | 7/1962 | McManis. | |
| 3,138,764 | 6/1964 | Dalton et al. | 328—182 |

ALFRED L. BRODY, *Primary Examiner.*